United States Patent
Hong

(10) Patent No.: US 7,372,524 B2
(45) Date of Patent: May 13, 2008

(54) LIQUID CRYSTAL DISPLAY DEVICE

(75) Inventor: Hyung Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 409 days.

(21) Appl. No.: 11/008,993

(22) Filed: Dec. 13, 2004

(65) Prior Publication Data

US 2005/0140839 A1    Jun. 30, 2005

(30) Foreign Application Priority Data

Dec. 30, 2003   (KR) .............. 10-2003-0100697

(51) Int. Cl.
*G02F 1/1335*    (2006.01)
(52) U.S. Cl. ........................................... 349/96
(58) Field of Classification Search ................ 349/96, 349/115, 106, 44
See application file for complete search history.

(56) References Cited

U.S. PATENT DOCUMENTS

| | | | | |
|---|---|---|---|---|
| 4,688,897 A | * | 8/1987 | Grinberg et al. ............. 349/162 |
| 5,686,979 A | * | 11/1997 | Weber et al. ................. 349/96 |
| 5,841,494 A | * | 11/1998 | Hall ............................. 349/98 |
| 5,899,551 A | * | 5/1999 | Neijzen et al. .............. 349/115 |
| 5,943,107 A | * | 8/1999 | Kadota et al. ................ 349/44 |
| 5,986,730 A | * | 11/1999 | Hansen et al. ................ 349/96 |
| 6,577,361 B1 | * | 6/2003 | Sekiguchi et al. ............ 349/96 |
| 6,989,875 B2 | * | 1/2006 | Yoon ............................ 349/96 |

* cited by examiner

*Primary Examiner*—James A. Dudek
(74) *Attorney, Agent, or Firm*—Birch, Stewart, Kolasch & Birch, LLP

(57) ABSTRACT

An LCD includes a first substrate on which a TFT and a color filter are formed, a second substrate spaced apart from the first substrate, and a liquid crystal layer interposed between the first and second substrates. A polarizer attaches over a lower surface of the first substrate, for changing a natural light into a linearly polarized light, and another polarizer attaches over an upper surface of the first substrate and has a transmission axis parallel to the first polarizer.

13 Claims, 4 Drawing Sheets

LIQUID CRYSTAL DISPLAY DEVICE

This application claims priority under 35 U.S.C. §119 of Korean application no. 10-2003-0100697, filed Dec. 30, 2003, the entire contents of which are hereby incorporated by reference.

BACKGROUND OF THE INVENTION

1. Field of the Invention

The invention relates to a liquid crystal display (LCD) device, and more particularly, to an LCD having a coating-type polarizer on its lower substrate.

2. Description of the Related Art

As the information-oriented society develops rapidly, there has recently emerged a demand for a flat panel display device having excellent characteristics such as a slim profile, light weight, and low power consumption.

An LCD, which is one of flat panel display devices, generally has excellent visibility, low power consumption and low heating value compared with a cathode ray tube (CRT) device of the same size.

Accordingly, the LCDs are now drawing attention as optimal next-generation display devices for cellular phones, computer monitors, and televisions, together with plasma display panels (PDPs) and field emission displays (FEDs).

An LCD includes two substrates having electric field generating electrodes. Surfaces of the two substrates, on which the two electrodes are formed, face each other. Liquid crystal molecules are injected between the two substrates. Applying a voltage between the two electrodes generates an electric field. The liquid crystal molecules reorient due to the electric field, and the light transmittance varies depending on the movement of the liquid crystal molecules. In this manner, the LCD displays images.

Generally, liquid crystal molecules have anisotropy. The anisotropy of a liquid crystal cell containing the liquid crystal molecules is varied depending on the distribution and tilt angle of the liquid crystal molecules with respect to the substrate.

This anisotropic property is an important factor in changing the polarization of light depending on the viewing angle of the liquid crystal cell.

FIG. 1 schematically illustrates the structure of a related art LCD.

As shown in FIG. 1, the LCD includes a lower substrate 120 having a thin film transistor (TFT), and an upper substrate 130 has a color filter. A liquid crystal layer 140 is interposed between the upper and lower substrates 130 and 120.

Also, the LCD further includes a first polarizer 129 attached to the rear surface of the lower substrate 120 and a second polarizer 139 attached to the front surface of the upper substrate 130. The first polarizer 129 polarizes natural light into linearly polarized light and transmits the same. The second polarizer 139 has a transmission axis perpendicular to the first polarizer 129.

The LCD further includes a backlight unit 110 provided at a lower portion of a liquid crystal panel, which includes the lower and upper substrates 120 and 130 and the liquid crystal layer 140. The backlight unit 110 supplies light emitted from a light source 111.

The lower substrate 120 includes a gate line and a data line perpendicularly arranged on a transparent substrate 121. Gate electrodes 122 extend from the gate line, and a gate insulating layer 123 is formed on an entire surface including the gate electrode 122. A semiconductor layer 124 is formed on the gate insulating layer 123, and a thin film transistor (TFT) including source/drain electrodes 125a and 125b formed on a semiconductor layer 124, is formed on the lower substrate 120.

A pixel electrode 127 connects with the drain electrode 125b of the TFT through a contact hole formed in a passivation layer 126 formed on the lower substrate 120.

Further, on the upper substrate 130, a black matrix 132 prevents light from being transmitted to regions except the pixel electrode 127, and the black matrix 132 is formed on a transparent substrate 131. A color filter pattern 133 of red (R), green (G), and blue (B), for reproducing a color is formed on the black matrix 132, and a common electrode 134 is formed on the color filter pattern 133.

The first and the second polarizers 129 and 139 are also respectively formed on outer surfaces of the lower and upper substrates 120 and 130, so that their transmission axes are perpendicular to each other.

Polarizers 129 and 139 separate natural light into polarized light components, pass a specific polarized light component among the polarized light components and absorb or disperse other components.

Light has the properties of electromagnetic waves and has vibrational components whose directions are perpendicular to the lights incident direction. Polarized light means a light beam having polarization in a specific direction, namely, light having a strong vibrational component in a specific direction among the vibration components perpendicular to the incident direction of the light.

Therefore, the vibration directions of light from the backlight unit 110 provided at the lower portion of the liquid crystal panel have the same probability for all directions perpendicular to the progression direction of the incident light.

At this point, the first and second polarizers 129 and 139 only transmit light vibrating in the same direction as their polarization axes, as compared to light vibrating in all directions. The polarizers therefore absorb or reflect light vibrating in other directions using an appropriate medium, thereby creating light vibrating in one specific direction.

The first and second related art polarizers 129 and 139 are arranged on opposite sides of the liquid crystal layer 140, and they attached to the lower and upper substrates 120 and 130 in such a way that their polarization axes may be perpendicular to each other. Therefore, when light passes through the liquid crystal layer 140, the intensity of a transmitted light is controlled depending on rotation degree of the polarization axes, such that gray-scale reproduction between black and white is possible.

However, in the related art structure, part of the polarized light transmitted from the first polarizer 129 attached to the lower substrate 120 of the liquid crystal panel changes into non-polarized light while passing through the liquid crystal panel.

That is, light is scattered by a stepped portion formed on the lower substrate 120 and the color filter layer 133 formed on the upper substrate 130, so that part of the polarized light transmitted from the first polarizer 129 changes into non-polarized light.

As described above, non-polarized light generates in the interior of the liquid crystal panel, and the light transmittance of the related art LCD is thus lowered and the contrast ratio deteriorates.

SUMMARY OF THE INVENTION

Accordingly, the invention is directed to a liquid panel display (LCD) device that substantially obviates one or more problems due to limitations and disadvantages of the related art.

An object of the invention is to provide a liquid panel display (LCD) device capable of increasing the contrast ratio by providing an additional coating-type polarizer in an inside of a liquid crystal panel so as to reduce non-polarized light generated in the inside of the liquid crystal panel.

An object of the present invention is to provide a liquid panel display (LCD) device capable of increasing the contrast ratio of the LCD by additionally forming a third polarizer on an upper portion of a lower substrate on which a TFT and a color filer are formed, to minimize non-polarized light in the inside of the liquid crystal panel.

The invention, in part, pertains to an LCD that includes a first substrate on which a TFT and a color filter are formed, a second substrate spaced apart from the first substrate by a predetermined distance, and a liquid crystal layer interposed between the first and second substrates. A first polarizer attaches over a lower surface of the first substrate, for changing a natural light into a linearly polarized light. A second polarizer attaches over an upper surface of the second substrate and has a transmission axis perpendicular to that of the first polarizer, and a third polarizer is formed between the first substrate and the liquid crystal layer.

The invention, in part, pertains to an LCD that includes a first substrate on which a TFT and a color filter are formed, a second substrate spaced apart from the first substrate by a predetermined distance, and a liquid crystal layer interposed between the first and second substrates. A first polarizer attaches to a lower surface of the first substrate, for changing a natural light into a linearly polarized light, a second polarizer attaches over an upper surface of the second substrate and has a transmission axis perpendicular to that of the first polarizer, and a third polarizer is formed between the first substrate and the liquid crystal layer and has a transmission axis whose direction is the same as the first polarizer. A backlight unit is provided at a lower portion of the first substrate, for supplying light.

The invention, in part, pertains to an LCD including a substrate having a TFT structure, a first polarizer attached over a lower surface of the substrate, for changing light into linearly polarized light, and a second polarizer formed over an upper surface and the TFT structure of the substrate, the second polarizer having a transmission axis whose direction is the same as the first polarizer.

In the invention, the first substrate can have a COT (color filter on TFT) structure in which the color filter is formed after the TFT is formed. On the other hand, the first substrate can have a TOC (TFT on color filter) structure in which the TFT is formed after the color filter is formed. The third polarizer polarizes non-polarized light that has been scattered by the TFT and the color filter formed on the first substrate, and the transmission axis of the third polarizer coincides with that of the first polarizer. Also, the third polarizer is coated over the first substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
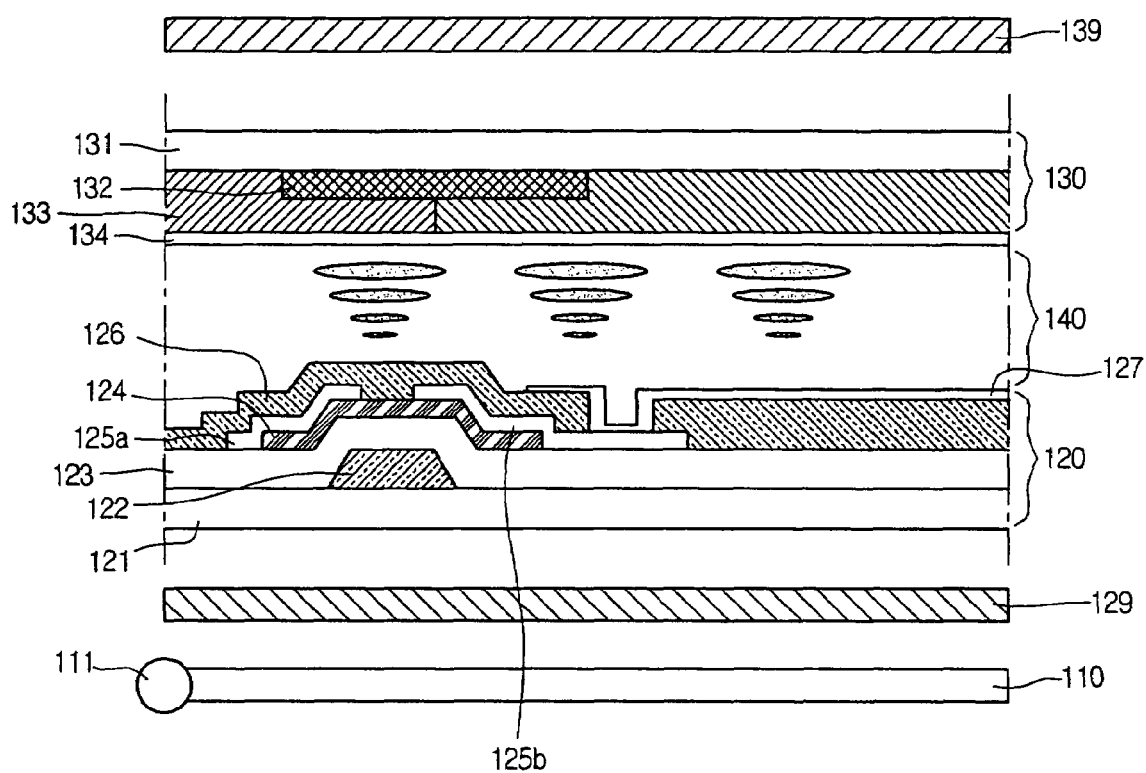
FIG. 1 schematically illustrates the structure of a related art LCD.
Figure 2:
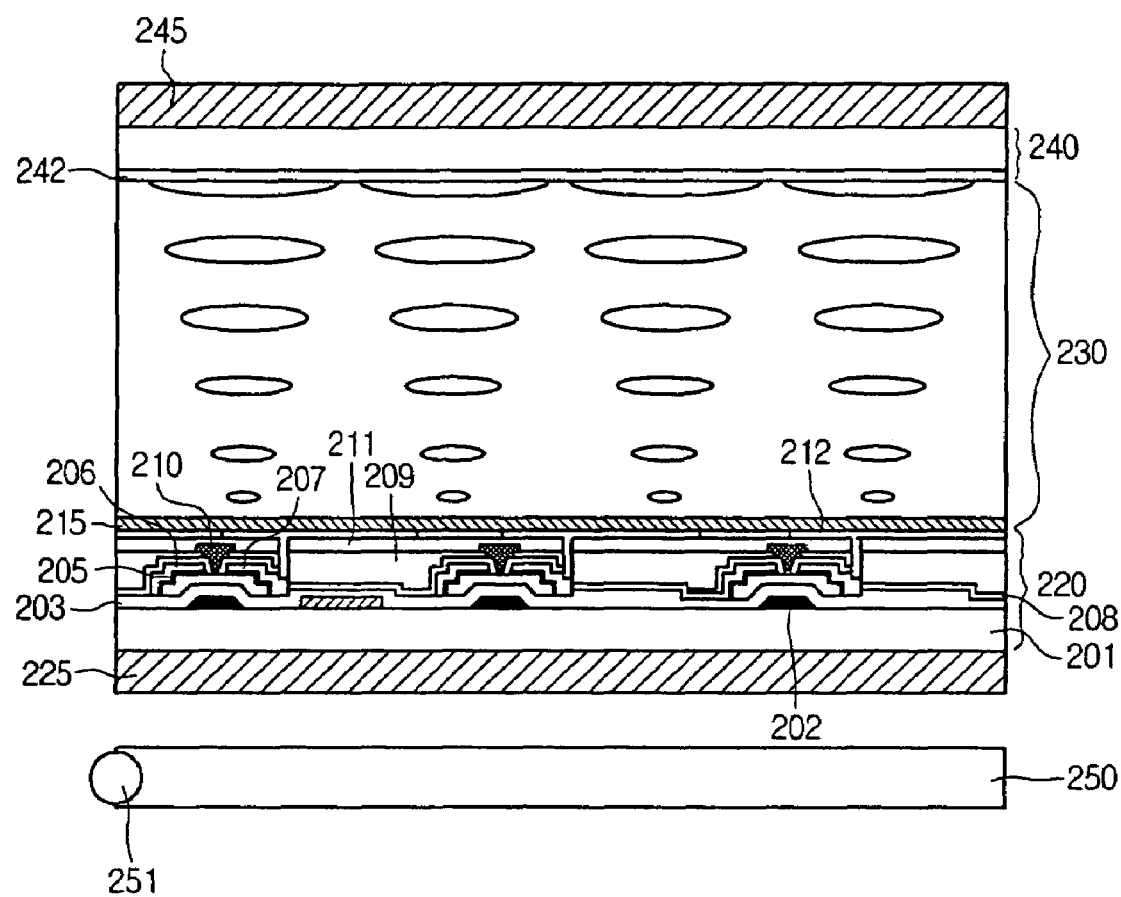
FIG. 2 is schematically illustrates the structure of an LCD according to the invention.

FIG. 2 schematically illustrates the structure of an LCD according to one embodiment of the invention.

FIG. 2 shows an inventive LCD that includes a first substrate, i.e., a lower substrate 220 on which TFTs and color filters are formed. A second substrate, i.e., an upper substrate 240 that faces the lower substrate 220, and a liquid crystal layer 230 is interposed between the upper substrate 240 and the lower substrate 220.

The inventive LCD in FIG. 2 also includes a first polarizer 225 attached to or located over a lower surface of the lower substrate 220, for changing a natural light into a linearly polarized light. A second polarizer 245 attaches to or is formed over an upper surface of the upper substrate 240, and the second polarizer 245 has a transmission axis perpendicular to that of the first polarizer 225. A third polarizer 215 is formed between the lower substrate 220 and the liquid crystal layer 230, and the third polarizer has the same transmission axis as the first polarizer 225.

Also, the inventive LCD includes a backlight unit 250 provided at a lower portion of a liquid crystal panel. Here, the liquid crystal panel is provided with the lower substrate 220, the upper substrate 240, the liquid crystal layer 230, and the backlight unit 250 which supplies light.

The lower substrate 220 is manufactured by the so-called "color filter on TFT" (COT) method, which forms a color filter on TFTs, or by the "TFT on color filter" (TOC) method, which forms TFTs on a color filter.

Hereinafter, a lower substrate having the COT structure will now be described as an example. However, the invention is not restricted to COT manufacture, and any appropriate method can be used to practice the invention.

The lower substrate includes gate lines (not shown) and gate electrodes 202 formed by depositing a gate metal layer on a transparent insulating substrate 201. The lower substrate also has TFTs including gate insulating layers 203, active layers 204, ohmic contact layers 205 and source/drain electrodes 206 and 207, which are sequentially formed over the substrate 201 on which the gate electrodes 202 are formed; and data lines (not shown).

Also, the lower substrate includes a passivation layer 208 deposited on or over the resultant structure so as to protect the elements. A color filter layer 209 has first to third colored layers formed at each pixel region over the passivation layer 208, in which the first to third colored layers are spaced apart from one another by a predetermined distance. A black matrix 210 is formed at gaps defined by the first to third colored layers, an overcoat layer 211 is formed on or over the black matrix 210, and a pixel electrode 212 is formed on or over the overcoat layer 211.

The pixel electrode 212 electrically connects with the drain electrode 207 of the TFT through a contact hole, which is formed in a part of the color filter layer 209 and the overcoat layer 211.

Also, a third polarizer 215 is coated on or over the pixel electrode 212.

The third polarizer 215 prevents polarized light transmitted from the first polarizer 225 from being transformed into non-polarized light in the interior of the liquid crystal panel, which includes the lower substrate 220, the upper substrate 240 and the liquid crystal panel 230. The transmission axis of the third polarizer 215 has about the same direction as that of the first polarizer 225.

Also, a common electrode 242 is formed on or over the upper substrate 240 that faces the lower substrate 220. The common electrode 242 applies a voltage for driving the liquid crystal layer 230. Any suitable liquid crystalline material can be used to form the liquid crystal layer 230. The liquid crystalline material can typically be a nematic liquid crystal having either positive or negative dielectric anisotropy suitable for forming a twisted nematic display.

Operation of the LCD according to a preferred embodiment of the invention will now be described with reference to FIGS. 3 and 4.

Figure 3:
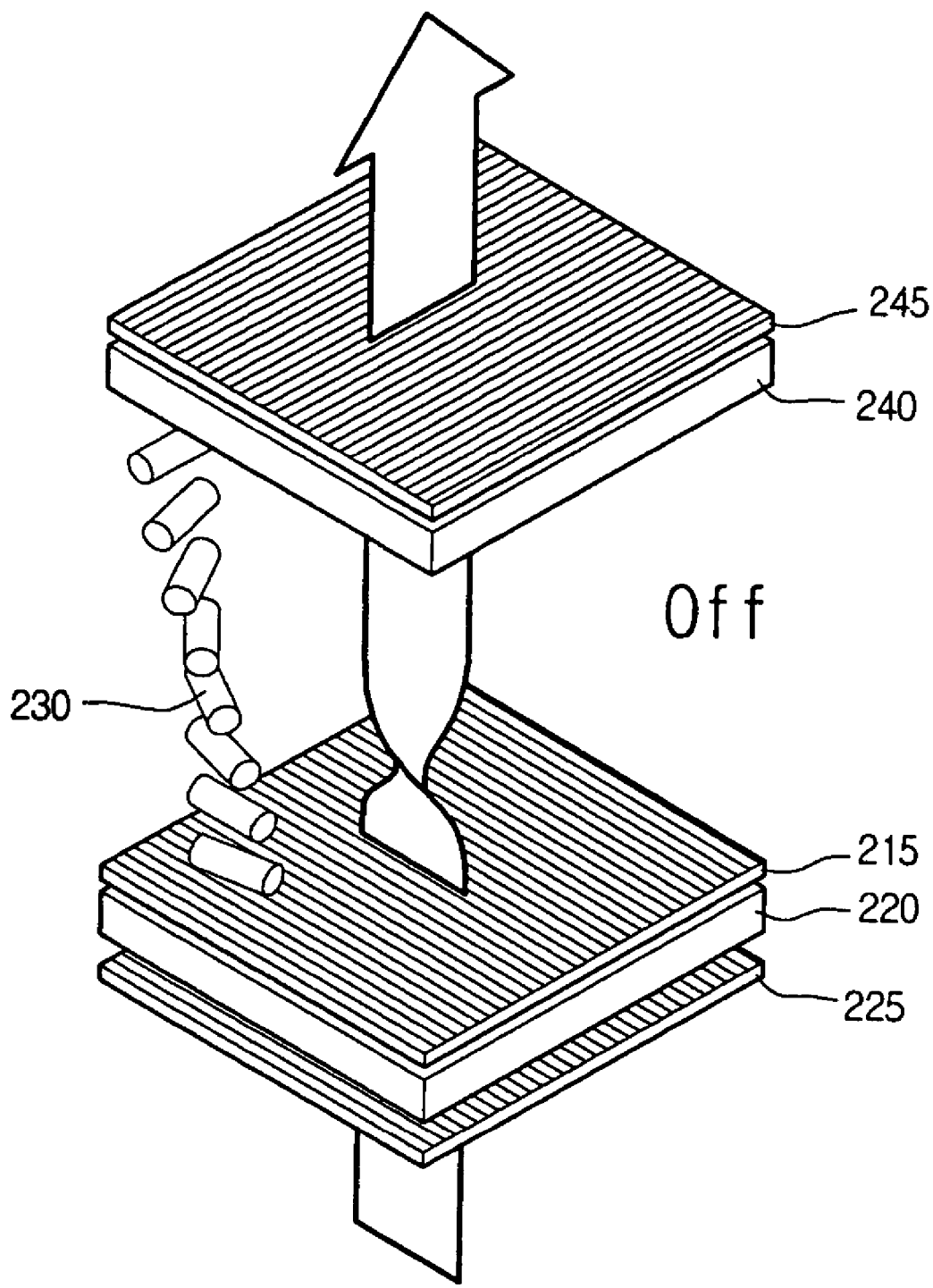
FIG. 3 illustrates the polarization when no voltage is applied to an LCD according to the invention.

FIG. 3 illustrates a polarization when no voltage is applied to an LCD.

FIG. 3 shows that if no voltage is applied to the LCD, only a first linearly polarized light (e.g., s-wave), from among the light mixture in the natural and ambient light incident to the LCD, passes through the first polarizer 225.

Then, the first linearly polarized light passes through the TFTs and the color filters formed on the lower substrate 220.

At this point, a portion of the first linearly polarized light passing through the lower substrate 220 scatters by action of a stepped portion of the TFTs and the color filter and then changes into non-polarized light.

The light changed into the non-polarized light passes through the third polarizer 215 and it is again changed into first linearly polarized light.

At this point, the transmission axis of the first polarizer 225 coincides with that of the third polarizer 215.

The first linearly polarized light that has passed through the third polarizer 215 irradiates the liquid crystal layer 230.

Here, since no voltage is applied to the liquid crystal layer 230, the light irradiated into the liquid crystal layer 230 transmits as a second linearly polarized light (e.g., p-wave) whose phase is changed by about 90°.

Then, the second linearly polarized light passes through the upper substrate 240 and then the first polarizer 245.

Figure 4:
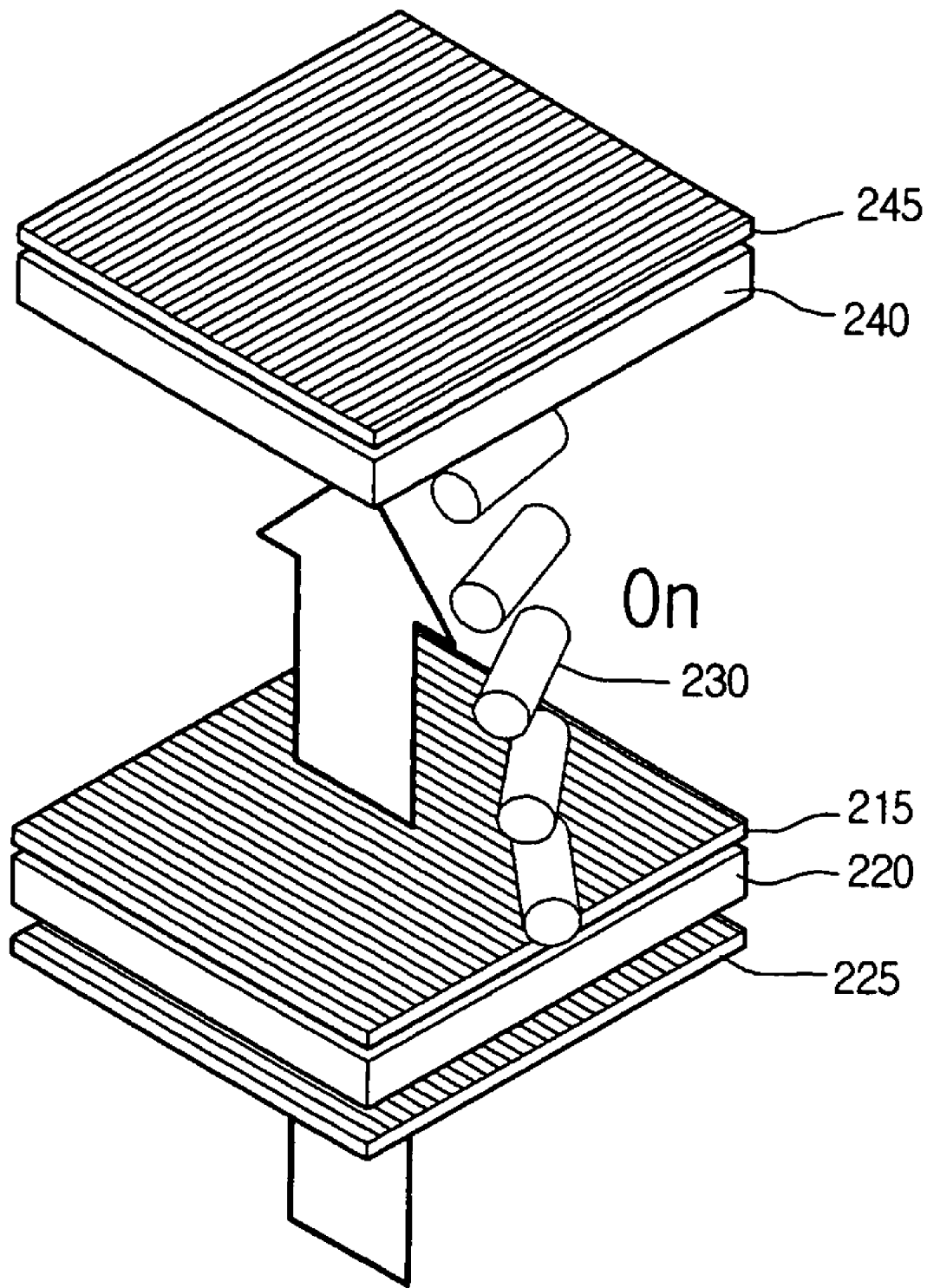
FIG. 4 illustrates the polarization when a voltage is applied to an LCD according to the invention.

FIG. 4 illustrates the light polarization when a voltage is applied to an LCD according to a preferred embodiment of the invention.

FIG. 4 shows that if a voltage is applied to the LCD, only a first linearly polarized light (e.g., s-wave) from among the light mixture in natural or ambient light incident to the LCD passes through the first polarizer 225.

The first linearly polarized light that has passed through the first polarizer 225, and then passes through the TFTs and the color filters, which are formed on the lower substrate 220.

At this point, part of the first linearly polarized light that has passed through the lower substrate 220 scatters by interference of a stepped portion of the TFTs and the color filter, and the scattered light then changes into non-polarized light.

This scattered light that has been changed into non-polarized light passes through the third polarizer 215, and it is again converted into the first linearly polarized light. Also, the linearly polarized light that has not been scattered passes through the polarizer 215.

At this point, the transmission axis of the first polarizer 225 coincides with that of the third polarizer 215.

The first linearly polarized light that has passed through the third polarizer 215 irradiates the liquid crystal layer 230.

Here, since a voltage is applied to the liquid crystal layer 230, the first linearly polarized light irradiating into the liquid crystal layer 230 transmits to the upper substrate 240 without any appreciable phase change.

Further, the light that has passed through the upper substrate 240 cannot pass through the second polarizer 245 having an absorption axis perpendicular to the first polarizer 225.

That is, according to the invention, the third polarizer 215 of the liquid crystal display device has the same transmission axis as the first polarizer 225, such that the polarized light passing through the first polarizer 225 does not change into non-polarized light.

Using the third polarizer 215, the inventive LCD can increase a contrast ratio of the LCD by minimizing the non-polarized light generated in the lower substrate 220.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) comprising:
   a first substrate on which a thin film transistor (TFT) and a color filter are formed;
   a second substrate spaced apart from the first substrate by a predetermined distance; a liquid crystal layer interposed between the first and second substrates;
   a first polarizer attached over a lower surface of the first substrate, for changing light into linearly polarized light;
   a second polarizer attached over an upper surface of the second substrate, the second polarizer having a transmission axis perpendicular to that of the first polarizer; and a third polarizer formed between the first substrate and the liquid crystal layer,
   wherein a transmission axis of the third polarizer coincides with that of the first polarizer.

2. The LCD according to claim 1, wherein the first substrate has the color filter on TFT (COT) structure in which the color filter is formed after the TFT is formed.

3. The LCD according to claim 1, wherein the first substrate has the TFT on color filter (TOC) structure in which the TFT is formed after the color filter is formed.

4. The LCD according to claim 1, wherein the third polarizer polarizes non-polarized light that has been scattered by the TFT and the color filter formed on the first substrate.

5. The LCD according to claim 1, wherein the third polarizer is coated over the first substrate.

6. A liquid crystal display (LCD) comprising:
   a first substrate on which a thin film transistor (TFT) and a color filter are formed;

a second substrate spaced apart from the first substrate by a predetermined distance;

a liquid crystal layer interposed between the first and second substrates;

a first polarizer attached over a lower surface of the first substrate, for changing light into linearly polarized light;

a second polarizer attached over an upper surface of the second substrate, the second polarizer having a transmission axis perpendicular to the first polarizer;

a third polarizer formed between the first substrate and the liquid crystal layer and having a transmission axis whose direction is the same as the first polarizer; and a backlight unit provided at a lower portion of the first substrate, for supplying light.

7. The LCD according to claim 6, wherein the first substrate has a the color filter on TFT (COT) structure in which the color filter is formed after the TFT is formed.

8. The LCD according to claim 6, wherein the first substrate has the TFT on color filter (TOC) structure in which the TFT is formed after the color filter is formed.

9. The LCD according to claim 6, wherein the third polarizer polarizes non-polarized light that has passed through the TFT and the color filter formed on the first substrate.

10. The LCD according to claim 7, wherein the TFT comprises a gate electrode, an insulating layer, an active layer, an ohmic contact layer, and source/drain electrodes, which are sequentially formed over the first substrate.

11. The LCD according to claim 10, further comprising:

a passivation layer formed over an upper portion of the TFT;

a color filter layer having first to third colored layers formed at each pixel over the passivation layer, the first to third colored layers being spaced apart from one another by a predetermined distance;

a black matrix formed at gaps defined by the first to third colored layers;

an overcoat layer formed over the black matrix; and a pixel electrode formed on the overcoat layer.

12. The LCD according to claim 11, wherein the pixel electrode is electrically connected with the drain electrode of the TFT through a contact hole formed in a part of the color filter layer and the overcoat layer.

13. The LCD according to claim 11, wherein the third polarizer is coated over the pixel electrode.

* * * * *